(12) United States Patent
Bjorklund (10) Patent No.: US 7,062,359 B2
(45) Date of Patent: Jun. 13, 2006

(54) SUBSTATION CONTROL SYSTEM (75) Inventor: Hans Bjorklund, Ludvika (SE)

(73) Assignee: ABB AB, Vasteras (SE)

( * ) Notice: Subject to any disclaimer, the term of this patent is extended or adjusted under 35 U.S.C. 154(b) by 737 days.

(21) Appl. No.: 10/025,963

(22) Filed: Dec. 26, 2001

(65) Prior Publication Data

US 2002/0107615 A1 Aug. 8, 2002

Related U.S. Application Data

(60) Provisional application No. 60/258,539, filed on Dec. 29, 2000.

(51) Int. Cl.
*G05D 3/00* (2006.01)
*G05B 23/02* (2006.01)

(52) U.S. Cl. .................. 700/286; 700/79; 700/292; 340/3.1

(58) Field of Classification Search ............ 700/79, 700/286, 295, 292; 340/3.1; 361/113, 93.2
See application file for complete search history.

(56) References Cited

U.S. PATENT DOCUMENTS 5,224,011 A * 6/1993 Yalla et al. ............. 361/93.2
5,694,329 A * 12/1997 Pomatto ................. 700/286
6,219,046 B1 * 4/2001 Thomas et al. .......... 345/708
6,222,714 B1 * 4/2001 Hoffman ................ 361/93.2

* cited by examiner

*Primary Examiner*—Jayprakash N. Gandhi
(74) *Attorney, Agent, or Firm*—Dykema Gossett PLLC (57) ABSTRACT

A control system for an electrical substation for transmission and distribution of electrical energy and equipment, comprising equipment for control, measurement, monitoring and protection of the substation. The control system comprises a substantially common bus means for communicating measurements and signals and between transmission and distribution equipment and functions for control, measurement, monitoring and protection run in computing means. Real time access for all measurement signals is enabled by the invention. More effective operation control is achieved with reduced cabling and duplication of hardware.

26 Claims, 7 Drawing Sheets

SUBSTATION CONTROL SYSTEM

CROSS REFERENCE TO RELATED APPLICATIONS

This application is related to U.S. Provisional Applications Ser. No.: 60/258,539 filed Dec. 29, 2000 the teachings of which are incorporated herein by reference.

TECHNICAL FIELD

The present invention is concerned with systems for supervision, control and protection of a substation for part of a high voltage (HV) or medium voltage (MV) transmission and distribution network. In particular this invention is an integrated system to provide functions of measurement, condition states, supervision, regulation, control and protection functions necessary for a HV substation.

BACKGROUND ART

Electrical power generation, transmission and distribution relies on a number of transmission and distribution networks to transfer electrical power to a series of end users, as well as the generating equipment itself. Generating equipment includes the devices for generating the electrical power, most often an electrical machine such as for example a synchronous generator. An electrical power generation, transmission and distribution network also includes the devices necessary for actually bringing the power to the transmission or distribution networks, such as power transformers, instrument transformers, circuit breakers of various kinds, surge arresters etc., as well as secondary devices such as transducers, sensors and other devices needed for controlling the system. A transmission network can include high voltage lines or cables, both AC and DC, and a diversity of equipment meant to ensure the secure and reliable transmission of power, for example reactors, capacitors, Synchronous Condensers, Static Var Compensators, FACTS components, etc., and secondary devices as referred to above.

The background of this invention is of substations in electrical power transmission and distribution networks. The invention also relates to generation and distribution functions of plants including smaller and less traditional generation means such as micro turbines, wind farms, Combined Heat and Power plants (CHP) and other often privately owned generators that supply power to the network in a distributed fashion.

By tradition, and under conditions of a regulated market with state or community owned monopolies, a utility company is a company that operates and usually owns generating and/or transmission/distribution equipment. The utility company carries out a range of functions including operation, maintenance and extension of a network in accord with both present and future requirements.

HV electrical stations with equipment to operate, control, regulate and protect substations are well known. They have been provided by means of a large number or more or less dedicated hardware units, each one specially constructed to carry out a small number of functions in each area of application. Occasionally certain single functions have been included and somewhat standardised in computer software. Each of the necessary input signals have been specifically distributed, for example in a hard-wired arrangement, to the specific hardware units that require them. This way to achieve traditional operation, monitoring, control and protection of substations has demanded a large quantity of physical electrical connections between the different measuring, relay and control, regulation or protection etc. units. Thereby a large number of terminals and extensive cabling which has a direct relation to reliability of such prior art systems.

Figure 1:
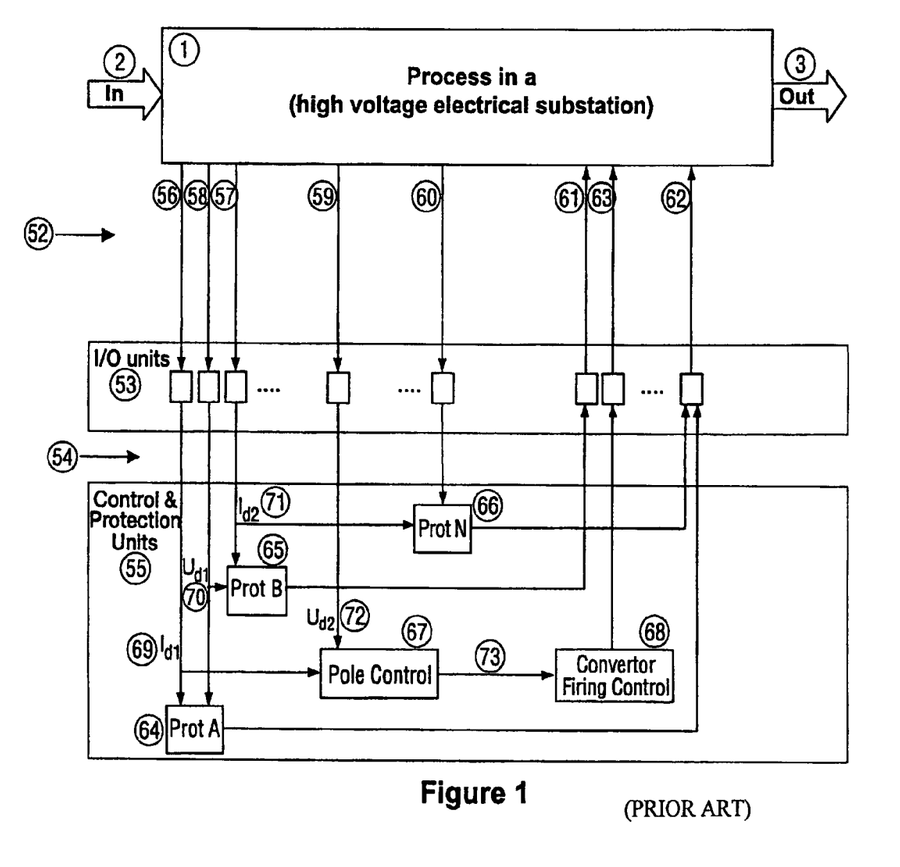
FIG. 1 shows an example of a prior art arrangement for exchanging and handling signals between the process of operating a HV substation and a separate control system and protection system in a high voltage substation.

FIG. 1 shows a traditional realization of Control and Protection for a substation, in which every measuring signal, status signal, maneuvering signal, and so on, has its own interface unit, and a dedicated wire, or dedicated channel in a serial bus, to transfer the signal to or from the control equipment. It can be seen that a measuring signal to Control and Protection Unit Prot A of $I_{d1}$ has it's own line through it's own I/O unit from DC current measuring signal 1 from the Process in a high voltage electrical substation. Likewise for $I_{d2}$ which has it's own measuring equipment, own line to own I/O unit, and own line to Protection unit Prot B.

In the Control Equipment, every signal is handled by a dedicated unit for protection, or firing control etc. If more than one unit needs the same measuring signal, for example DC current, it is most probable that a new, separate measuring chain from the main circuit measuring unit, through the interface and the wire or connection, must be established for each unit needing the same signal. Sometimes the same signal can be used by more than one unit, provided the units are not physically located too far from each other, but in most cases this is not possible.

The principal drawback of this traditional method is that an

- extensive set of measuring devices,
- extensive set of dedicated interface units,
- extensive wiring between interface and control equipment, and an
- extensive set of dedicated units for performing all the control and protection functions are all required. In addition, this solution is not very flexible, since practically every change in, or addition of, a control, regulation, monitoring or protection function requires installation of new hardware units at a measuring point and/or wiring to provide a new, for example, measuring device, and a new separate measuring chain between the measuring device and a control center.

In more recent times information between certain hardware units has begun to be communicated using serial data connections, for example by means of fieldbuses. Connection of specific measurement signals to specific functional units, for example protection, has brought about a certain reduction in the quantity of terminal connections and cabling need for certain aspects of a substation control system.

Currently and under de-regulation market conditions have led to a re-focussing of priorities as regards the requirement for operation, maintenance and extension of a transmission and distribution network to better meet present requirements and future requirements. First, all these aspects are expected to be carried out under a more cost effective and predictable cost regime. Second, emphasis on meeting stringent power levels, power availability and power quality requirements set by regulatory authorities exists together with a generally much reduced willingness to invest in installed plant throughout the industry. Third, the growing numbers of small generators such as wind farms, micro turbines, and CHP plants being connected to power grids in recent times has made it more difficult to carry out network control functions such as balancing loads in parts of the network. Thus, utilities and operators are faced with the challenge of delivering high quality, reliable electric power at competitive rates to their customers by using limited manpower and resources. The inventor has determined that there is a need for devices, systems and methods that can provide operation, maintenance and extension of a substation in a power system in a cost-effective and reliable way.

SUMMARY OF THE INVENTION

An object of the invention is to provide a rational arrangement for control, regulation and protection of a substation for transmission and distribution of electrical power in which measurements and condition states are made available to all functions of the control system in real time.

Another object of the invention is to provide a control system that facilitates supplementary functions such as maintenance, development, extension of the substation.

Another further object of the invention is to provide a simulation means to evaluate and/or optimise operational conditions of the substation by simulating substation operation using any or real times values, set values or stored historical values.

These and other objects are achieved by a control system according to claim 1, and a method for control of a substation according to method 13. A computer program product for implementing the invention is described in claim 24.

The general advantage of the invention is that may be carried out in more effective and automated way by means of a computerized control system for the substation according to the invention.

According to the invention the system provides that all or almost all functions from the different functional areas of application, both primary and supplementary are transferred together, integrated and handled in one and the same information environment. This is carried out using commercially available standard computers, standard processors or microprocessors, which interact and work together via a data network and/or serial data buses, or both.

A characteristic of an aspect of the invention is that information, ie data, in a data network environment may be transferred between the units connected to such a data network with sufficient speed, typically in a time shorter than a millisecond, to carry out real-time control, regulation and protection functions. Information in this data network environment comprises:

in-signals for measurement values, and
manual or automatic set values,
algorithms in the form of, or realised by, computer program product or software portions such as software implemented modules or objects from one or more operating process algorithms,
resultant out signals and equipment manoeuvre instructions to the process
algorithms in the form of, or realised by, computer program product or software portions such as software implemented modules or objects for simulation of any operation condition of the substation, including conditions arising from renovatioon or extension of the substation,
stored signals and values referred to above such as historic data,
algorithms in the form of software implemented modules or objects for analysis and correction of original and/or developed problems or mistakes in existing computer program code; possibly as debugging,
digitally produced and digitally stored documentation such as circuit schematics, connection schematics, equipment lists, operator manuals, maintenance instructions, software implemented activatable connections (or links) between signals and documentation in order to show desired signal vales, or set values, in digital schematics of principle organisation, and,
line/wiring schematics and similar algorithms in the form of software implemented modules or objects, in order to calculate from the above described signal values or stored signal values when the main process circuit equipment requires maintenance.

By means of that all the information such as in-signals, set values and out-signals is always available in real time for all parts of the substation control system, computerized control of substantially every function in real time achieved. The implementation of the invention is extremely flexible, even to the point of allowing inclusion of changes and improvements without the requirement for installation or alteration of measuring equipment or connections between measuring equipment and the control system.

In addition it is easy to add new functions without the requirement or restriction of considering the physical placement of the different equipment units. The system further makes possible completely new functions not previously made available in any form as a result of that all the signals and information is collected and immediately available throughout the system.

By means of the system and the method included in implementation a drastic reduction in cabling between different parts of the substations is achieved. With that reduction follows a similar reduction in the number of terminals and connection points, which enables a significant improvement in reliability. Cost for cabling and it's installation is correspondingly reduced.

Another advantage is that because the hardware is simply upgraded at a later time with a need to upgrade the software because the system is designed and realised with commercially available standard hardware. This means that future performance improvements in micro-processors will enable the system according to the invention to be upgraded simply by upgrading the micro-processor and processors in the standard computers. The increased calculating and modelling capacity available after each hardware upgrade provides more capacity to integrate new functions in the system (integrated simply by the addition of new software to calculate the new functions based on the existing access to all of the in-signals, out signals and stored set values).

According to another aspect of the present invention there is provided a computer data signal embodied for control of a function and/or a part of the substation.

A further object is to provide, according to other aspects of the invention, one or more computer program products and computer software for carrying out the methods of the invention.

The computer data signal may be transmitted within the computerised system and/or sent outside the system to other private or public networks including the Internet.

BRIEF DESCRIPTION OF THE DRAWINGS

A more complete understanding of the method and apparatus of the present invention may be had by reference to the following detailed description when taken in conjunction with the accompanying drawings wherein.

DESCRIPTION OF THE PREFERRED EMBODIMENTS

Overview

Figure 2:
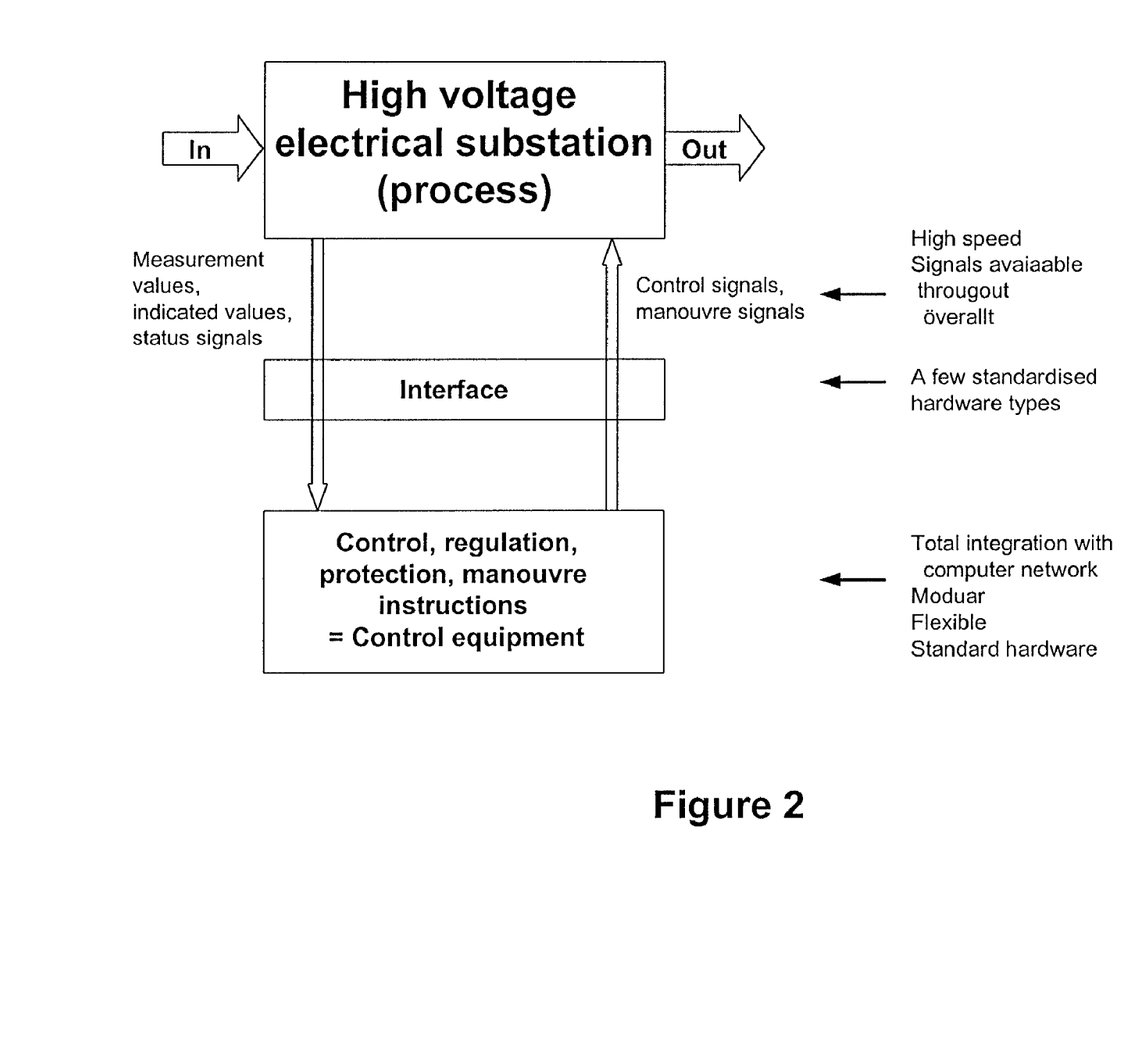
FIG. 2 shows in a summary block diagram a simplified overview of an aspect of an embodiment of the invention.

FIG. 2 shows substation for high voltage transmission and distribution of electrical power. A operational process of the substation 1 is shown. An arrangement of control equipment is shown schematically. An interface is shown, and two sets of signals are shown going in different directions between the control equipment and the high voltage substation process via the interface.

FIG. 2 is meant to indicate in a general and very simplified block diagram, that the invention integrates a great number of interface, control and protection functions in a high voltage substation. The interface is built using a few standardized, modular, programmable units housed in standard circuit board racks. The I/O units communicate with the control equipment via medium or high-speed serial data buses.

In the control and protection block all functions are realized by using programmable, software modules, giving an extremely flexible solution which allows easy modifications and additions of the different control and protection functions.

A typical embodiment of the invention includes all functions needed for a HVDC converter substation. Such an embodiment consists of the following functional parts to realize the primary method:
  Station control,
  Pole Control,
  Converter Control,
  Valve Control,
  Thyristor Control Units,
  Protections for AC and DC side,
  Analogue input/output interface between the embodiment and the main circuitry for measuring current, voltage, temperature etc
  Binary input/output interface between the embodiment and the main circuitry for detecting status signals from, and sending maneuvering signals to, breakers, disconnectors etc.,
  Human/Machine Interface (HMI),
  Monitoring and Supervision facilities,
  Telecommunication,
  Remote Control Interface.

All vital primary functions are, in practice, usually doubled for highest possible reliability, with one system active and the other running standby, ready to rapidly take over the active control when a fault in the active system is detected. This principle is prior art, though, and it will not be discussed further in this description.

The typical embodiment of the invention also includes the following functional parts to realize the supplementary method:
  Tools for Electrical Design
  Software Design tools (graphical, modular and programming), including code generation from block diagrams and also including graphical debugging
  Simulation Tools
  Resources for Factory Testing assistance
  Sequential Events Recorder (SER) for binary signals
  Transient Fault Recorder (TFR) for analogue signals
  Integrated Electronic Documentation
  Maintenance System, including maintenance planning, spare parts inventory and report/log of maintenance activities Some of the above functional parts are described in greater detail further on in this description.

To physically carry out the above functions, a set of hardware and a set of software are required. Typically, the following hardware would be needed:
  a number of modular interface units to convey signals between the main circuitry of the substation and the central hardware,
  one or more commercially available standard computers, constituting the heart of the control system, called main computers,
  a number of electrical, optical or wireless, standard serial data buses to convey information between interface units and main computers
  a number of modular extension boards with Digital Signal Processors, providing ultra-fast calculation capability, needed for certain measured signals, and for some control and protection functions,
  a limited number of electrical, optical or wireless, standard computer networks and data buses to convey information between different parts of the invention's embodiment,
  mechanical racks and cubicles suitable to house the above interface, bus, network and main computer hardware,
  equipment for Human/Machine Interface (HMI), consisting of data display units such as Cathode Ray Tubes (CRT), plasma displays, LCD displays; the equipment also consisting of devices for outputting information on paper, such as laser or ink printers and plotters; the equipment also consisting of operator input devices such as keyboards, touch sensitive displays, or voice command input arrangements.

All input and output devices could be connected to the system via electrical or optical wires, or wirelessly, for example by radio or infrared links.

Typically, the following software would be needed:
  an operating system, such as Windows NT, Unix or Linux, running in the main computers included in the invention's embodiment,
  appropriate software needed to operate, handle and monitor all data buses and data networks in the system, if not included in the operating system above, a graphic, modular programming tool for design, testing, code generation, and debugging of all functions in all application fields of the invention, a compiling software program capable of converting the created functional modules and their logical interconnections to appropriate program code in the format needed to run and execute the same functions in all processors included in the invention's embodiment, appropriate software to simulate both main circuit equipment and AC and DC networks in order to make possible to test the performance of all control and protection functions included in the invention's embodiment before, or instead of, using it in real operation.

The simulation software may be used to test "what-if" scenarios for different load settings, protection settings, measurement values etc, preferably offline. The simulation software may also be used to test measured or stored values of measurements, values, error messages or alarm settings together with different load settings, protection settings, measurement values etc, again, preferably offline.

Detailed Description of an Embodiment

Figure 4:
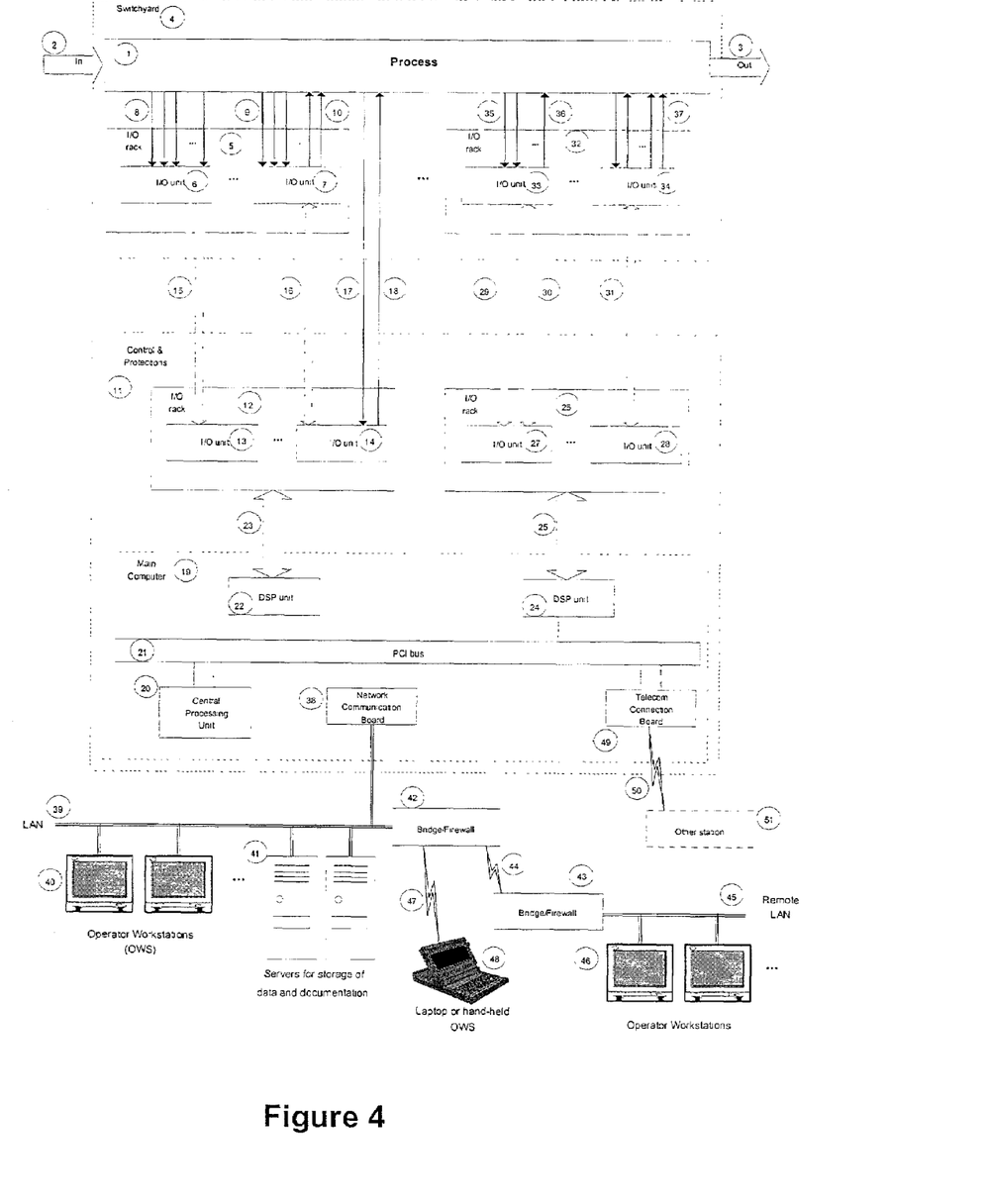
FIG. 4 shows an example of a detailed system and logical schematic, including a data network and operator work stations, for exchanging and handling signals between an HV substation process and the control and protection system in a HV substation, according to another embodiment of the invention.

FIG. 4 shows a detailed description of the invention, and other details will be further explained below. The purpose of prior art FIG. 1 was to show the difference between prior art and the invention, regarding the method to realize control equipment and interface for a high voltage electrical substation.

FIG. 2 illustrates in a simplified way how the development of microelectronics has lead to, and made possible, the invention's high level of functional integration and the consequential reduction of physical housing and wiring.

Figure 3:
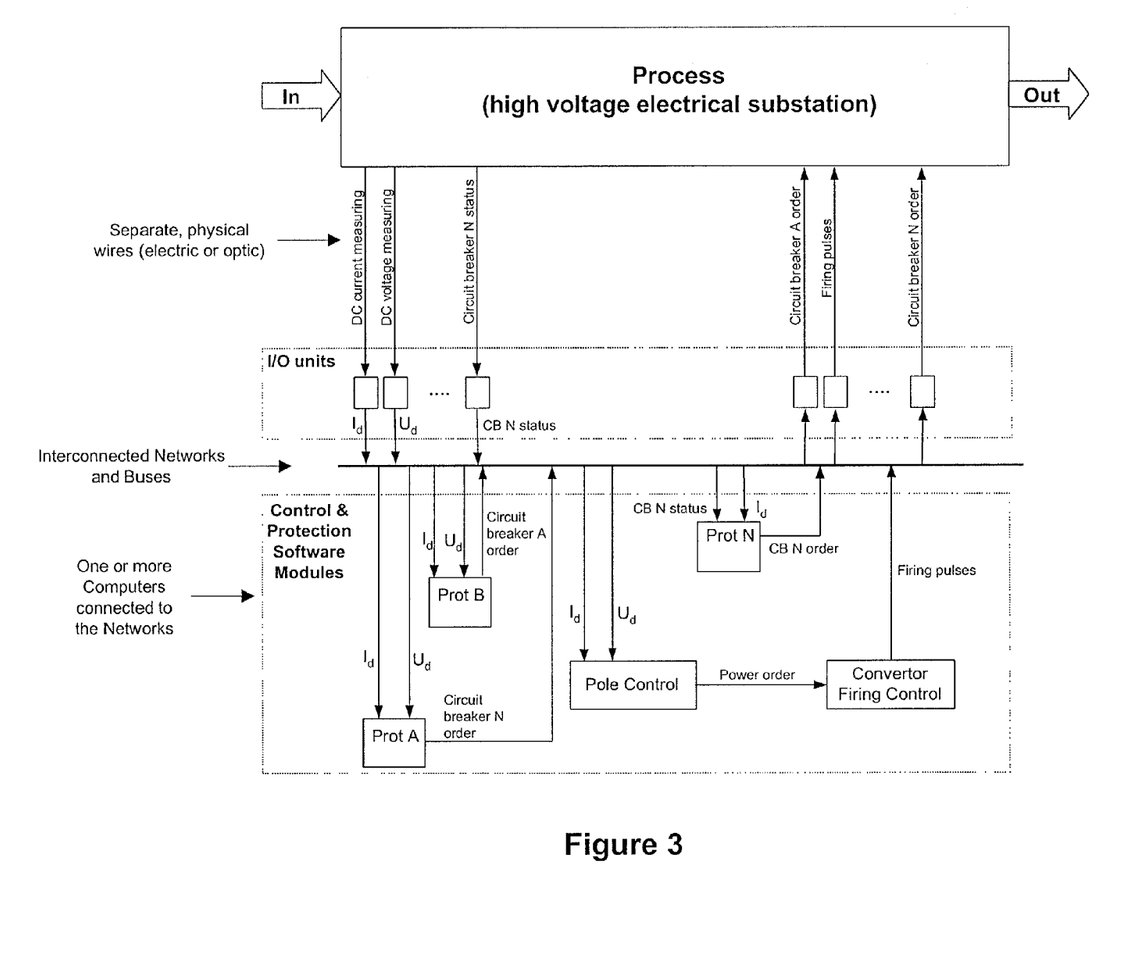
FIG. 3 shows an example of a system and logical schematic for exchanging and handling signals between an HV substation operation process and the control and protection system in a HV substation, according to an embodiment of the invention.

FIG. 3 shows schematically a system and logic for a control system including the process of the high voltage substation, a number of examples of measurement in-signals $I_d$, $U_d$, and equipment status signal CBN Status being sent out from the process. The in-signals $I_d$, $U_d$, and CBN Status are depicted going through I/O units of a Interface function to a bus, labeled Interconnected Networks and Buses in FIG. 3. From the Interconnected Networks and Buses the in-signals $I_d$ and $U_d$ are available for and sent to Prot A, Prot B Pole Control and Prot N. Likewise it is shown that in-signal CBN Status is available via the Interconnected Networks and Buses for Prot N.

FIG. 3 shows as examples of out-signals Circuit Breaker A order from (Protection Software Module) Prot B, (Control Software module) Circuit Breaker N order from Prot A to the bus, from where the out signals are further transmitted to I/O units and in to the high voltage substation process equipment. Likewise another out-signal, Firing pulses, is shown generated from (Control Software module) Converter Firing Control, as a result of a signal from (Control Software module) Pole Control. The Pole Control out-signal "Firing pulses" signal would be dependent on the in-signals $I_d$, $U_d$, and sent to it via the bus, Interconnected Networks and Buses. Other out signal examples, for maneuver instructions, the Circuit Breaker A order, Circuit Breaker N order, are sent to the bus, from where they are available for and sent via I/O units to respective circuit breaker equipment in the substation process.

In the invention's realization of Interface units and Control and Protection functions, according to FIG. 3, all the drawbacks of the prior art equipment of FIG. 1 are eliminated or minimized. Every significant main circuit parameter is measured or monitored each in only one point, and the corresponding values are transferred to and from the control and protection functions via a standardized interface and a system of interconnected networks and buses. In this network and bus system, every signal is available to every control and protection function that need them, presently or in the future, without the need for installation of new measuring devices, new interfaces or new wiring.

Furthermore, all control and protection functions are realized by software modules, easily programmable, using a high-level graphical interface which automatically converts the human way of specifying the functions with readily understandable and interpretable, logical block diagrams, to computer program code. The automatic compilation also eliminates the risk of typing errors.

FIG. 4 shows a process 1 of a high voltage substation, in a switchyard 4. A number of Control and protection functions 11, are shown with I/O means 12, 26, and 13, 14, 27, 28. A main computer 19 is shown with a central processing unit 20 connected to a bus, a PCI bus 21, to which are connected Digital Signal Processing units 22, 24, further connected to the I/O means 12, 26. A network Communication Board 22 and Telecommunications Board 49 are also connected to the PCI bus 21. The Network Board 38 further connects to a Local Area Network or LAN 39. Operator workstations 40 and data and documentation storage servers 41 are connected to the LAN. The LAN 39 also comprises a Bridge or Firewall 44 for secured communications via a link from computing devices, hand held devices, telephones or portable computers such as laptop 48.

FIG. 4 is used to give a more detailed description of another embodiment of the invention. The starting point is the process 1, consisting of an electrical power flow into 2, and a corresponding flow out of 3, a high voltage substation.

The process 1 includes a set of main circuit apparatus to control the power flow in different ways, such as stopping, starting, regulating, reducing and reversing power flow in a number of operational modes to fulfill the specified requirements of the substation. The main circuit devices can be transformers, converters, circuit breakers, disconnectors, arresters, filters, reactors, coolers and other high voltage equipment. All this is well-known prior art and it is not further dealt with in this description.

To control and protect the process and its main circuit equipment, a number of its parameters must be measured and transferred to the control and protection system. Another set of signals must be returned to the process to control and operate main circuit apparatus like converters, tap changers and breakers. All important analog parameters such as AC and DC current, AC and DC voltage, and temperatures, are measured. The output from each measuring unit 8 is connected to a standardized analog interface or I/O unit 6. These units are equipped with Digital Signal Processors (DSP), being capable of receiving a number of analog signals and converting them to digital representation (a method known as sampling) with sufficient speed and resolution. A number of I/O units are placed in a standard rack (5), which, if suitable, could be enclosed in a box located in the switchyard, close to the measuring devices.

Another type of I/O unit 7 is used to receive binary signals, like positions of breakers, dis-connectors and tap changers. Such units are bi-directional and are also capable of sending maneuvering signals (10) to main circuit devices like breakers or tap changers.

The transfer of signals between I/O racks 5, 32 located in the switchyard, and the control and protection system, is accomplished by different kinds of serial data buses. For sampled analog signals with high band-width requirements, over 10 Mbit per second, a Time Division Multiplexed (TDM) bus 15 could be used. This bus is mono-directional. Examples of signals requiring high-speed transfer are current and voltage.

For sampled analog signals with speed requirements below 10 Mbit per second, and binary signals, a Control Area Network (CAN, ISO standard 11898) is used 16. This bus is bi-directional. Examples of such signals are temperature, breaker and tap changer position. The control and protection equipment hardware consists of at least one I/O rack 12, equipped with an appropriate set of I/O units 13, 14, and a main computer 19 including at least one extension board with Digital Signal Processors (DSP) 22. The I/O rack and the extension unit are connected via a multi-polar cable 23. The internal data communication and signal transfer within the main computer utilizes a standard parallel back plane bus PCI 21.

The above-mentioned hierarchy of interface units, data buses and networks, constitutes a complete signal path between the process and the central processing units. Note that an I/O unit 14 can, if considered appropriate, communicate directly with the process, receiving measuring or status signals 17 and sending maneuvering signals 18, without having to pass through I/O units located in the switchyard 6, 7. This is another example of the flexibility of the embodiment of the invention.

To complete the general availability of all signals and data within the whole system of the embodiment, the PCI bus 21 also has a Network Communication Board 38 connected to it. This board is capable of transferring data between the PCI bus and a Local Area Network LAN 39, adhering to Ethernet Standard, IEEE 802.3, to which Operator Workstations (OWS) 40, and servers 41 for storage of long-term measuring and operational data, as well as documentation, are also connected.

Usually the substation is operated from a remote control center. Via network bridges and firewalls 42, 43, and a suitable data communication link 44 the LAN can be extended to the remote center, making all the substation's information, data and control facilities available in the remote LAN 45.

A portable computing device such as a laptop computer 48 could optionally be used as an OWS, by connecting it to the LAN 39 via a suitable telecommunication link 47 to the firewall 42. This makes monitoring, diagnosis, and even operation of the substation possible from anywhere. If such a laptop computer, or similar hand-held device, even a suitably equipped Personal Digital Assistant PDA such as a Palm Pilot (Trade Mark) or mobile telephone with I-mode or WAP capability, such as an Ericsson (Trade mark) 380i, connected via a wireless communication link, makes it is possible for a substation operator to walk around with it in the switchyard. He or she can then stop by a transformer, or a circuit breaker, or some other main circuit device, to inspect it visually, and he can simultaneously look at the device's documentation on-screen, check the circuit diagram with real time measuring values superimposed, check the maneuvering log, and so on.

In an HVDC or an HVDC light converter station at one end of a power transmission line there is usually a requirement for the control system to communicate with the similar system in an other station situated for example at the other end of the power transmission line. To satisfy this requirement, a Telecommunication Connection Board 49 can be connected to the PCI bus 21, opening one or more direct data communication channels 50 with the other station 51.

For large substations with numerous measuring and control signals, the interface channels can easily be multiplied and expanded, simply by adding more I/O racks, both in the switchyard 32 and in the control system 26. Each rack has room for a number of I/O units 33, 34, 27, 28, capable of handling more signals from 35 and to 36, 37 the process, transferring them via TDM 29 and CAN 30, 31 buses to and from added DSP units 24 in the main computer 19.

Preferred Embodiment

Figure 5:
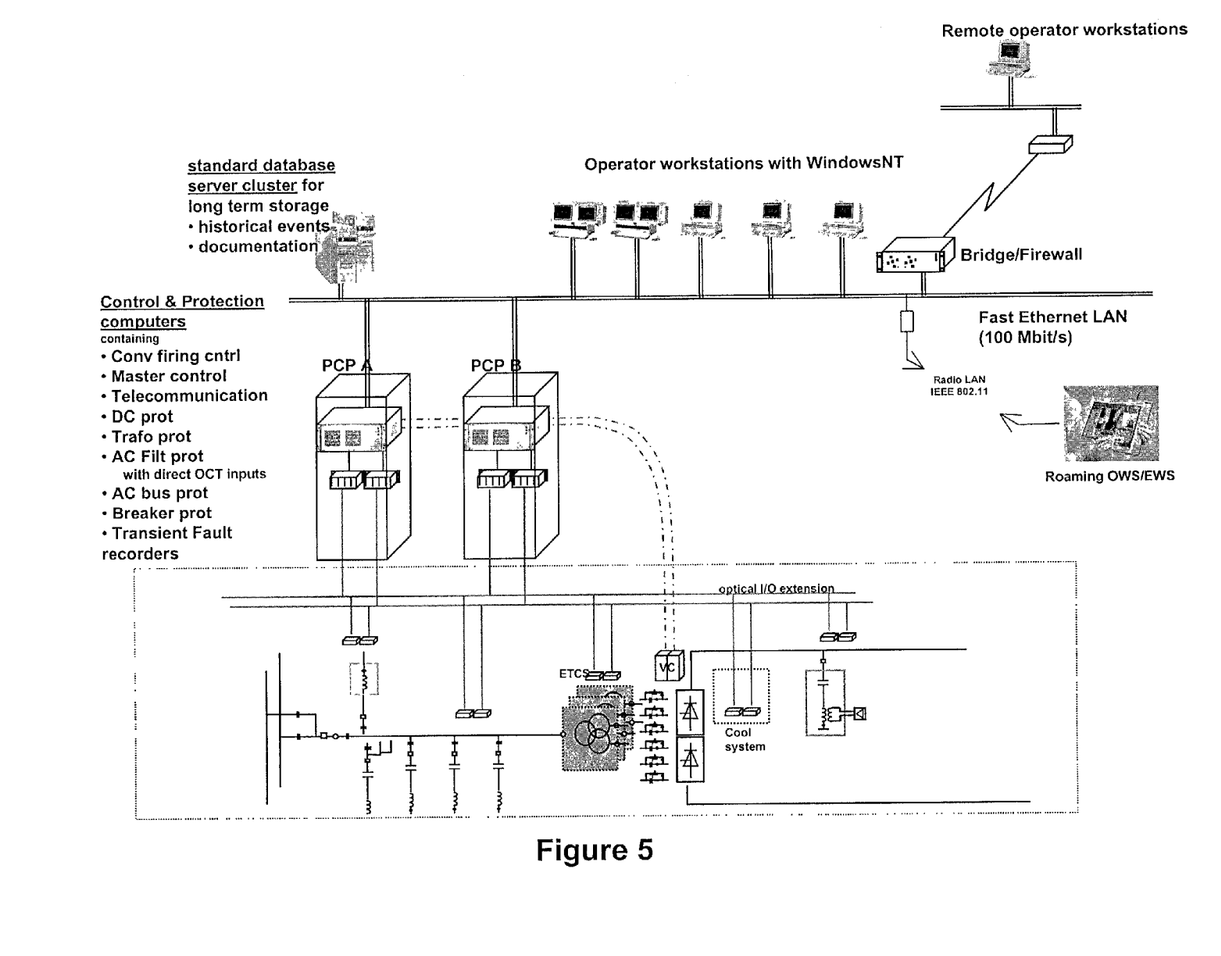
FIG. 5 shows an example of a detailed system and logical schematic, for control and protection for one large HVDC pole, including a data network and operator work stations, according to another embodiment of the invention.

A preferred embodiment of the invention is illustrated in FIG. 5, showing one pole of a large HVDC converter substation. FIG. 5 illustrates that control and protection functions such as those listed in the diagram, Converter firing control, Master control, Telecommunication, DC protection, Transformer (Trafo) Protection, AC Filter Protection with direct OCT inputs, AC bus Protection, Breaker Protection and Transient Fault recorders which are all contained in the Control and Protection computers PCP A and PCP B. The main computers PCP A and PCP B are connected to a fast Ethernet LAN, which are connected operator work stations OWS, data servers, and a bridge firewall etc., similar to the arrangement of FIG. 4. A radio LAN to IEEE 802.11 standard is also depicted.

Main computers PCP A and PCP B are also shown connected by bus means to a process of the high voltage converter station for access to in-signals and transfer of out-signals and/or maneuver instructions.

Another way of expanding an embodiment of the invention is to use several control systems, interconnected via a common substation LAN.

Figure 6:
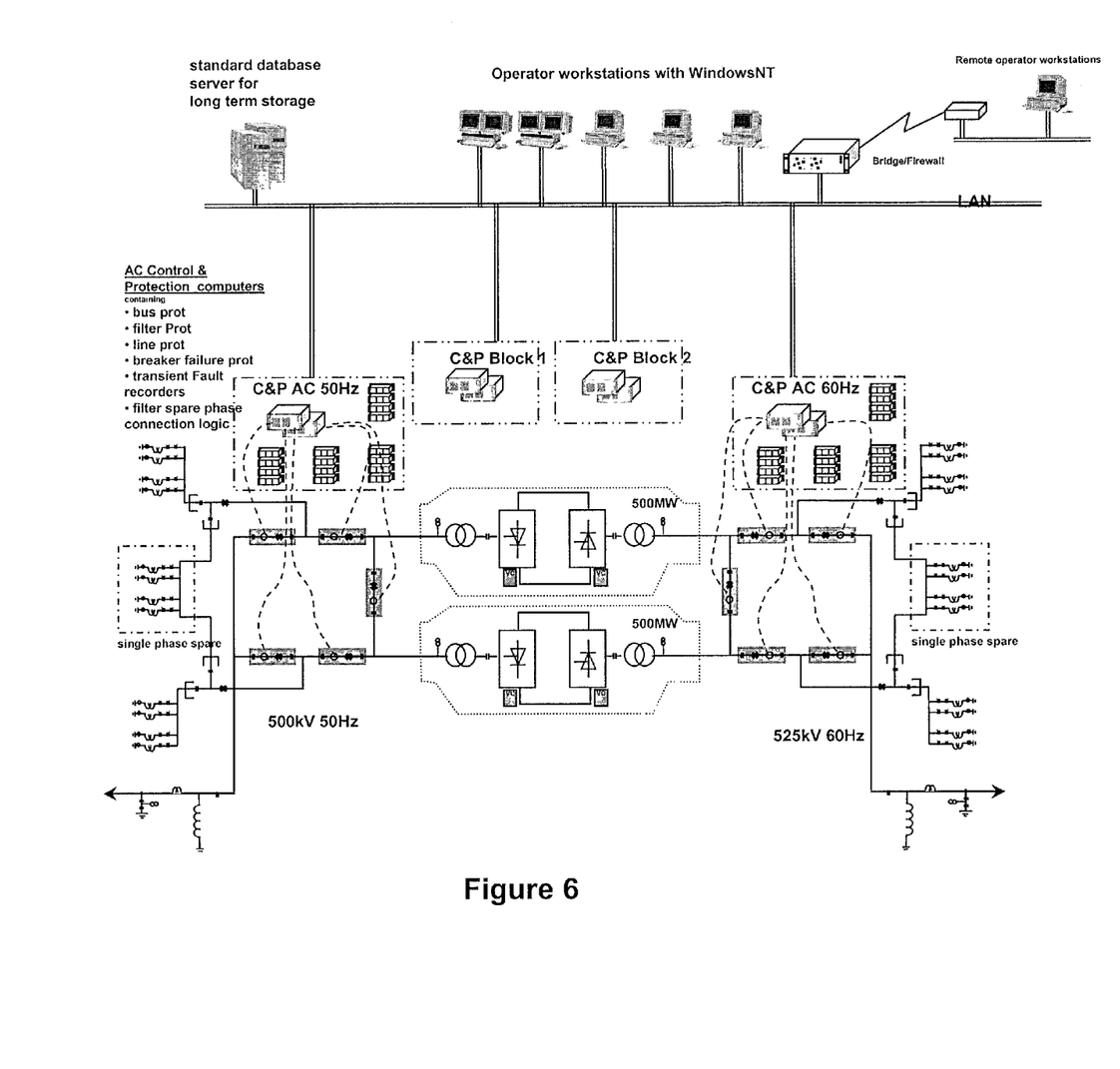
FIG. 6 shows an example a system and logical schematic for exchanging and handling signals between the process and the control and protection system in a high voltage converter substation according to a preferred embodiment of the invention.

FIG. 6 shows a schematic for a HVDC back-to-back converter station with four main computer systems, with associated I/O units and hierarchical networks, all interconnected via a common LAN. Even in a complicated control system like this, any signal can still easily be accessed in any node in the whole network, without need for additional wiring or units. This illustrates an important essence of the invention.

Description of Certain Functional Parts

Below, functional parts that are included in embodiments of the invention are explained in more detail.

Pole Control and Protections for AC and DC Side

All these functions are realized with software modules. All control and protection functions are created using a graphical, high-level block-programming language. After drawing a function's logical diagram, both the corresponding circuit diagram part and the low level computer program code are automatically generated. This minimizes the risk of miss-typing program code characters and string syntax.

Control functions like power control, tap changer control and sequences are run in the main computer's CPU (shown for example in FIG. 4, nr 20). The Converter Firing Control and all protection functions are run in multiple Digital Signal Processors on extension units, (FIG. 4, nrs 22 and 24). In these units, the program code is stored in Flash PROMs, meaning they can be programmed and re-programmed via the data bus without need to remove the units from their racks. Some I/O units (FIG. 4, nr 6) also utilize Digital Signal Processors DSPs, which can be programmed and re-programmed the same way, via the data buses.

Analog Input/Output Interface

This function accomplishes isolation and level adjustment between the main circuitry and the control equipment for signals measuring current, voltage, cooling water temperature etc. Some of these signals, like current and voltage, require very fast transmission into the control equipment, while other signals, like temperature, do not need that fast transmission. Depending on speed requirements, different signal processing and data transmission solutions are chosen.

All analog measuring signals are primarily processed in the I/O units and are converted to digital form.

For high-speed signals a Time Division Multiplexed (TDM) serial data bus is used to transfer the data into the main computer. This bus is capable of transferring more than 10 megabits per second, corresponding to 10 kilosamples per second or more. The bus is mono-directional and it is mostly used for transfer of analog measuring values into the main computer.

The remaining signals are transferred via a Control Area Network (CAN) with a speed of typically less than 10 megabits per second.

Binary Input/Output Interface

This function accomplishes isolation and level adjustment for status and maneuvering signals between the main circuit equipment, like breakers, disconnectors and tap changers, and the control equipment. Status and maneuvering signals are already binary. No conversion is needed, only level adjustment.

These signals are transferred via the Control Area Network (CAN) with a speed less than 10 megabits per second. The transfer is bi-directional; that is, the CAN is capable both of receiving status signals and sending maneuvering signals.

Human/Machine Interface (HMI)

Compared to a traditional HMI, the HMI according to an aspect of the invention offers the substation operator on-line digital documentation of the entire substation and all its parts, including display of real-time values in circuit diagrams to facilitate monitoring of signals and trouble-shooting.

One function of the Human Machine Interface is equipped with schematic graphical representations of transmissions lines such that real time values may be displayed on request, such as by a double click on an icon with a computer mouse, or by another selection means, so displaying actual real-time electrical or other values (eg temperatures) for parts or components of the lines. The display may also represent in more detail actual circuits. Again using the schematic graphical representations of circuits real time values may be displayed, on request, for parts, lines or components of said circuits.

Since all events occurring in the substation are monitored and stored in a database, the invention also offers improved maintenance and maintenance planning support. For example, a circuit breaker will need maintenance after a certain number of maneuvers. Breaking high currents will cause more wear of the contacts than breaking low currents. The system will track every single maneuver together with the current load at the breaking moment, and calculate the contact wear according to those parameters. When the contacts need maintenance, the system may be configured to automatically notify the operator.

In a another embodiment, operations and methods of the invention can be implemented as software suitable for use over the Internet, such as, for example, an applet, executable application or agent, which is written or programmed in an object oriented program language with object oriented program code such as Java (Trade Mark) and/or Smalltalk (Trade Mark). As well or alternatively the software may be based in part on web browser technologies developed from protocols or meta-languages descended from Stand General Markup language (SGML) such as Hypertext MarkUp Language (HTML), eXtended markup Language (XML), or eXtended Hypertext Markup Language (XHTML).

Operations and methods of the invention can also be implemented at least in part via a telephone with a fixed or wireless connection to a telephone or data network. This is best carried out using a telephone suitably equipped for communication with digital networks such as by means of Wireless Application Protocol (WAP), I-Mode or Bluetooth enabled. Such a telephone may be used to display information and provide interactive communication with networked or Internet embodiment of the invention. Such a telephone equipped to receive and/or manipulate information from the software modules of the substation control system to inspect status and levels, make choices or issue commands. This may be carried out by means of menu-driven or graphic user interface (GUI) driven software running on the telephone. The software running on the telephone is preferably software enabled for graphic manipulation of symbolic means displayed by the telephone based on HTML, cHTML, XML, similar or other software including such as Wap Markup Language WML and similar. Similar other software can include protocol such as Handheld Markup Language (HDML).

The present invention is not limited only to substations such as high voltage converter stations but may include other types of applications, such as, for example, power distribution stations for different areas of a network, including power supplies to individual customers including large customers such as manufacturing plants, paper mills, rolling mills, car assembly plants, oil and gas installations, refineries etc.

Figure 7:
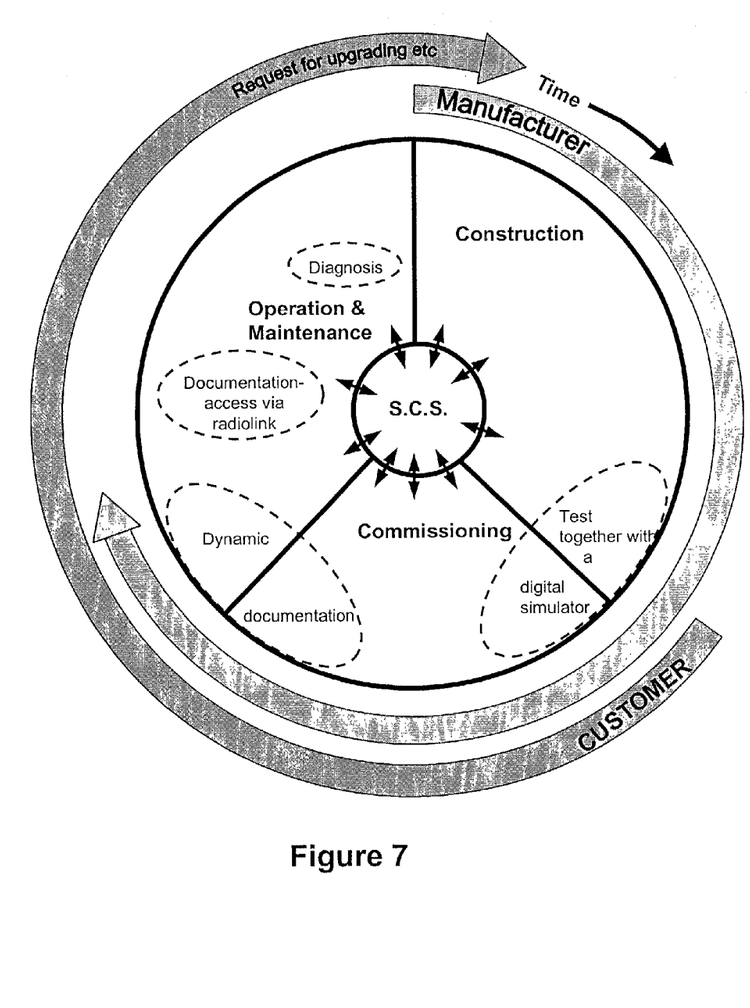
FIG. 7 shows a simplified diagram for operation, maintenance, simulation, diagnosis and expansion/renovation of a high voltage substation according to an aspect of the invention.

FIG. 7 shows that, in addition to the above-mentioned, an aspect of the invention also covers the embodiment of a number of supplementary application fields and functions during the substation's entire life cycle, such as design, testing, simulation, maintenance, documentation, and upgrading. The simulation aspect of the schematic circuit design software enables test or actual or stored actual values to be re-run or simulated under selected conditions. By this means maintenance may be better predicted and operating configurations, loads etc better selected. Further, such testing and optimisation may be used to specify extensions to the substation and/or to specify designs or configurations for a new substation.

It is to be understood that any of the methods described may be carried out by one or more computer program products or computer software containing a computer program code element or computer code means or software code portions for enabling a computer or a processor carry out one or more of a series of instructions according to any of the methods described.

It is also noted that while the above describes exemplifying embodiments of the invention, there are several variations and modifications which may be made to the disclosed solution without departing from the scope of the present invention as defined in the appended claims.

The invention claimed is:

1. A control system for an electrical substation for transmission and distribution of electrical energy comprising equipment for control, measurement, monitoring and protection of the substation, and I/O means for communicating measurements and signals and bus means for transferring measurements and/or signals between transmission and distribution equipment and control, measurement, monitoring and protection equipment, wherein said measurements and signals are transferred between the I/O means and the control, measurement, monitoring and protection means by means of a common bus by means of which software modules for control, regulation and protection of said substation have real time access to said measurements and signals.

2. The control system for an electrical substation according to claim 1, wherein in-signals are arranged transferrable via the I/O means and functions of control, protection and monitoring implemented as software modules in substantially one computer.

3. The control system for an electrical substation according to claim 1, wherein out-signals and/or maneuver instructions are arranged transferrable via the I/O means from functions of control, protection and monitoring implemented as software modules substantially in one computer.

4. The control system for an electrical substation according to claim 1, a control and protection function includes software modules providing the operation of any or all of DC Protection, AC Protection, Pole Control, Converter Firing Control running at the same time and substantially in one computer.

5. The control system for an electrical substation according to claim 1, wherein one or more functions for maintenance is provided and arranged suitably with access to real time values via a bus means.

6. The control system for an electrical substation according to claim 5, wherein the one or more functions provided for maintenance are arranged suitably with access to stored historical values and measurements from design, test and service operations of the substation control system.

7. The control system for an electrical substation according to claim 1, wherein the one or more functions for control, operation or maintenance are provided with a software simulation program means arranged suitably with access to stored historical values and measurements from design, test and operation the substation control system.

8. The control system for an electrical substation according to claim 1, wherein an I/O means of the substation comprises one or more high speed Time Division Multiplexed (TDM) buses.

9. The control system for an electrical substation according to claim 8, wherein an I/O means of the substation comprises one or more a buses of type Control Area Network according to ISO standard 11898.

10. The control system for an electrical substation according to claim 8, wherein an I/O means of the substation comprises one or more Digital Signal Processors (DSP).

11. The control system for an electrical substation according to claim 8, wherein a Human Machine Interface is provided equipped with schematic representations of lines such that real time values may be displayed on request for parts or components of said lines.

12. The control system for an electrical substation according to claim 8, wherein a Human Machine Interface is provided equipped with schematic representations of circuits such that real time values may be displayed on request for parts or components of said circuits.

13. The control system according to claim 1, including means to provide a control function for a substation of a power transmission and distribution system.

14. The control system according to claim 1, including means to provide a protection function to a substation of a power transmission and distribution system.

15. The control system according to claim 1, including means to provide a maintenance function for a substation of a power transmission and distribution system.

16. The Control system for a substation according to claim 1, including means to provide a condition monitoring system to monitor the condition of a high voltage DC converter station.

17. The control system according to claim 1, including means to provide control functions for a power transmission and distribution system associated with any type of electrical generating plant as diverse as a wind power generator, a windfarm, a tidal power plant, a fuel cell, a combined generation and storage plant.

18. The control system according to claim 1, including means to provide control functions for a power transmission and distribution system associated with any type of industrial plant as diverse as plants such as an airport, a hospital, a paper mill, a petroleum refinery or a vehicle assembly plant.

19. A method to control a substation for the transmission and/or distribution of electrical power, by means of making measurements and registering one or more operational states, generating in-signals dependent on measurements and states of the transmission and/or distribution process, accessing set values, making comparisons between set values said measurements and states, and generating out-signals in dependence on those comparisons, wherein the method include the steps of:

receiving in-signals from a plurality of measuring instruments to an I/O means, transferring the in-signals via the I/O means to a bus means, receiving the in-signals via the bus means via a bus of a computer, sending out signals and/or manoeuvre instructions from the computer to the process of the substation via the bus means and an I/O means.

20. The method to control a substation for the transmission and/or distribution of electrical power according to claim 19, wherein in-signals are sampled, states of equipment are sampled, set values are accessed and compared to in-signals and/or states, comparisons are made and monitoring out-signals and condition states are generated.

21. The method to control a substation for the transmission and/or distribution of electrical power according to claim 19, wherein in-signals are sampled, states of equipment are sampled, set values are accessed and compared to in-signals and/or states, comparisons are made and out-signals, manoeuvre instructions and states are generated to regulate a part of the process in the substation.

22. The method to control a substation for the transmission and/or distribution of electrical power according to claim 19, wherein in-signals are sampled, states of equipment are sampled, set values are accessed and compared to in-signals and/or states, comparisons are made and out-signals and condition states are generated to provide information for a maintenance function for a part of the substation.

23. The method to control a substation for the transmission and/or distribution of electrical power according to claim 19, wherein said substation control system is operated by making selections from a graphical representation on a screen display means of any of:
- a computer connected by a LAN network to the control system;
- a computer connected by a WAN network to the control system;
- a computer connected by a telephone network to the control system;
- a computer connected by a short range radio link to the control system;
- a mobile telephone connected by a telephone network to the control system; or
- a mobile telephone connected by a short range radio link to the process system.

24. The method according to claim 19, including a computer program product comprising computer code means or software code portions for enabling a computer or a processor to carry out the steps of the method.

25. The method according to claim 24, wherein the computer code means or software code portions comprise executable parts formed written in as one or more object oriented programs and accessible and implementable over a network such as the Internet.

26. The method according to claim 19, including computer program contained in a computer readable medium, comprising computer program code means to make a computer or processor carry out the steps of the method.

* * * * *

UNITED STATES PATENT AND TRADEMARK OFFICE
CERTIFICATE OF CORRECTION

| | |
|---|---|
| PATENT NO. | : 7,062,359 B2 |
| APPLICATION NO. | : 10/025963 |
| DATED | : June 13, 2006 |
| INVENTOR(S) | : Bjorklund |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (737) days Delete the phrase "by 737" and insert -- by 857 days--

Signed and Sealed this

Twenty-seventh Day of February, 2007

JON W. DUDAS
*Director of the United States Patent and Trademark Office*